S. ROBICHAUX & C. PAGGI.
PIPE PULLER.
APPLICATION FILED DEC. 8, 1917.

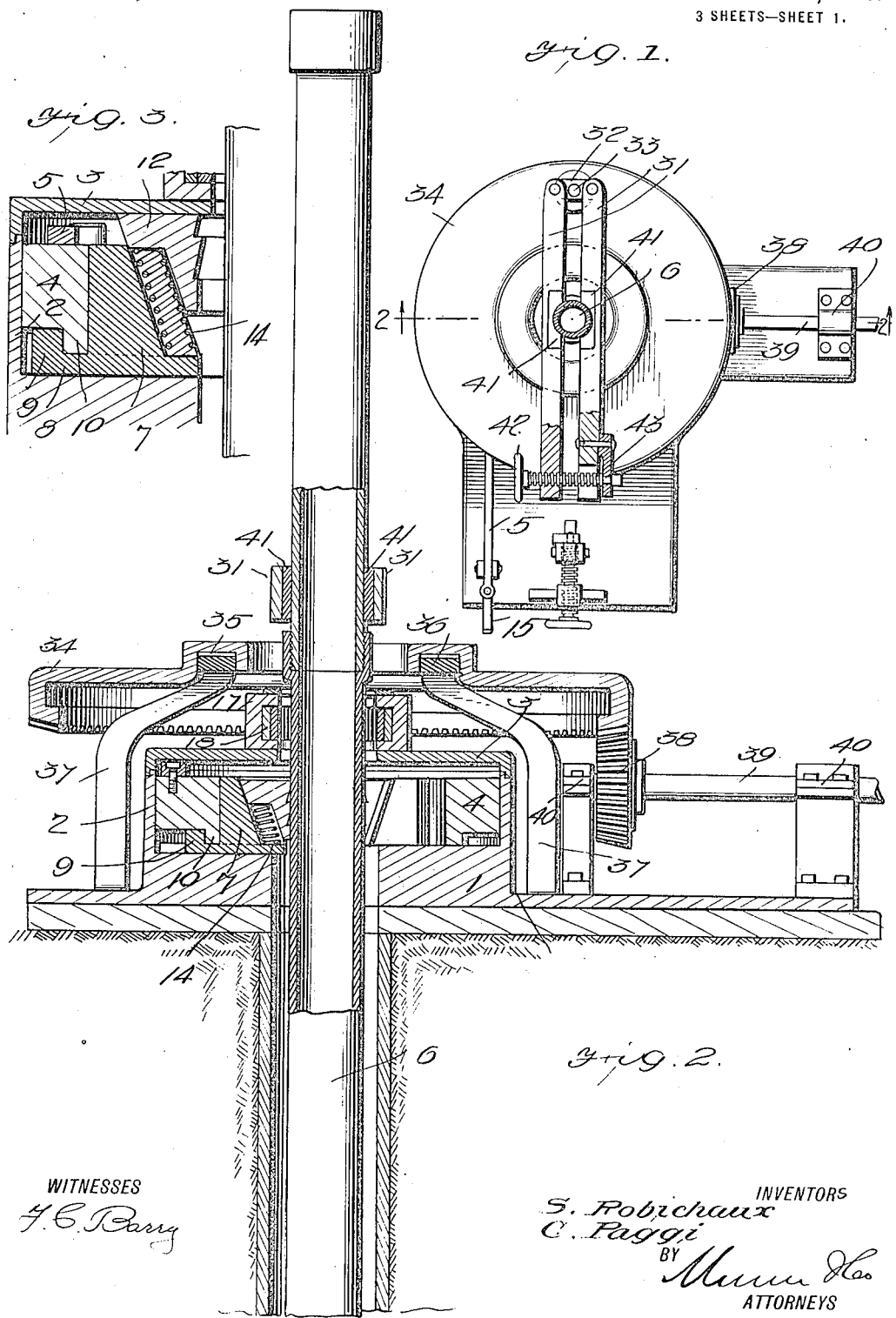

1,280,850.

Patented Oct. 8, 1918.
3 SHEETS—SHEET 2.

WITNESSES

INVENTORS
S. Robichaux
C. Paggi
BY
ATTORNEYS

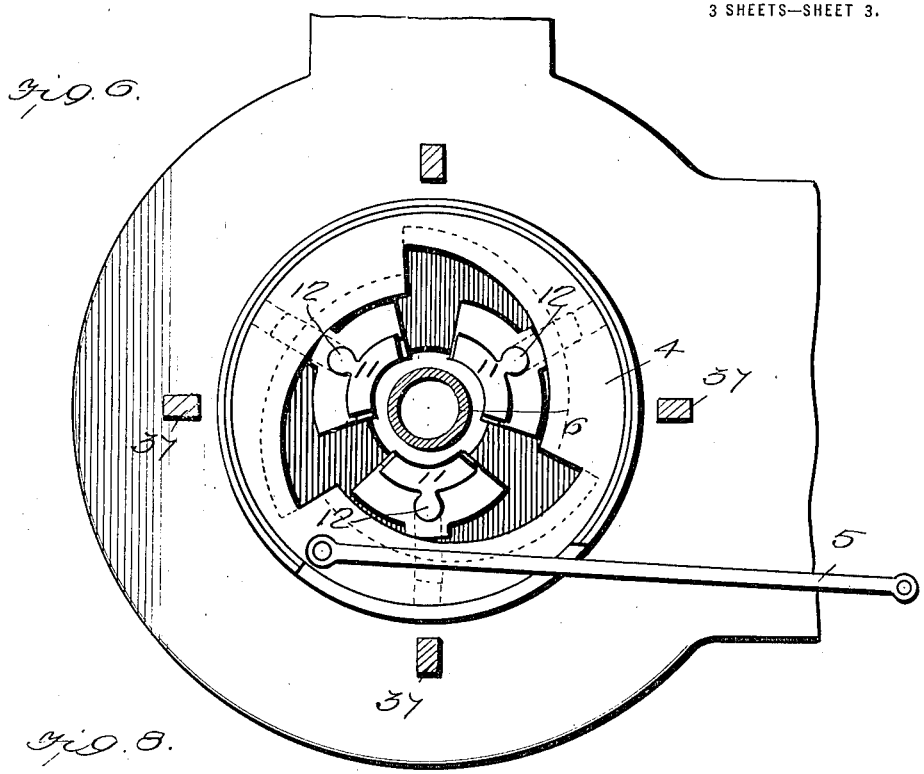
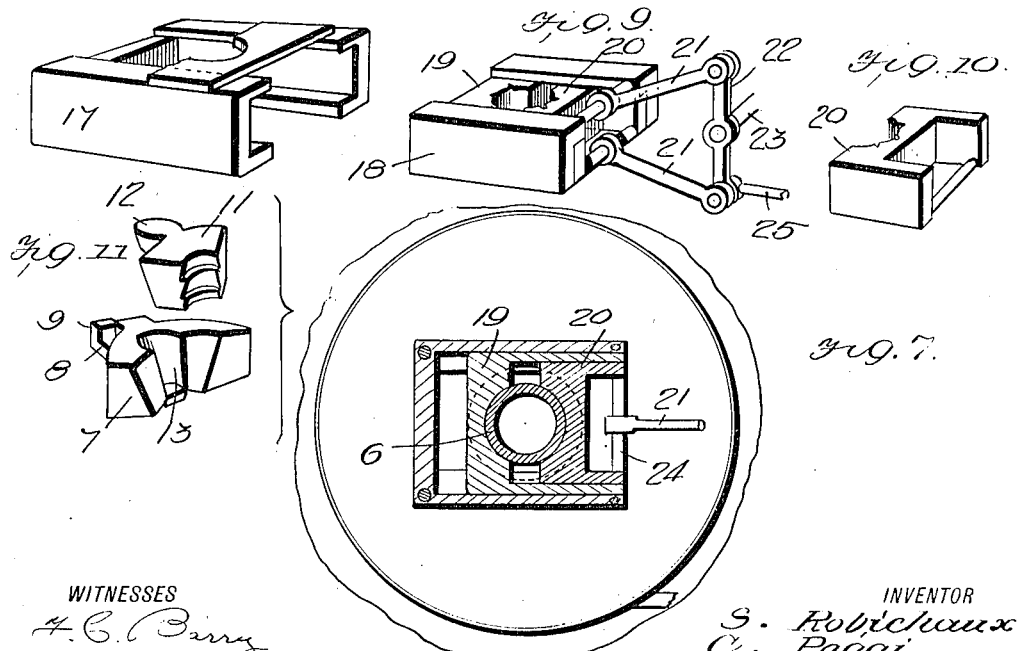

UNITED STATES PATENT OFFICE.

SOSTHENE ROBICHAUX AND CHARLES PAGGI, OF SARATOGA, TEXAS.

PIPE-PULLER.

1,280,850.  Specification of Letters Patent.  Patented Oct. 8, 1918.

Application filed December 8, 1917. Serial No. 206,314.

*To all whom it may concern:*

Be it known that we, SOSTHENE ROBICHAUX and CHARLES PAGGI, citizens of the United States, and residents of Saratoga, in the county of Hardin and State of Texas, have invented certain new and useful Improvements in Pipe-Pullers, of which the following is a specification.

My invention is an improvement in pipe pullers, and has for its object to provide mechanism for use in connection with pipe casings of wells, for assisting in the pulling of the pipe, the said mechanism being designed to firmly grip and hold the several sections after the pipe has been lifted, and having mechanism for unscrewing the section just lifted.

In the drawings:

Figure 1 is a top plan view of the improved lifter, with parts in section;

Fig. 2 is a section on the line 2—2 of Fig. 1, looking in the direction of the arrows adjacent the line;

Fig. 3 is an enlarged sectional detail of one of the gripping jaws;

Fig. 6 is a section similar to Fig. 5, showing the parts in another position;

Fig. 7 is a horizontal section through the holding mechanism for the lower pipe section;

Figs. 8, 9 and 10 are perspective views of the gripping device for the lower pipe section; and Fig. 11 is a perspective view of one of the holding dogs for the lower section.

Figure 4:
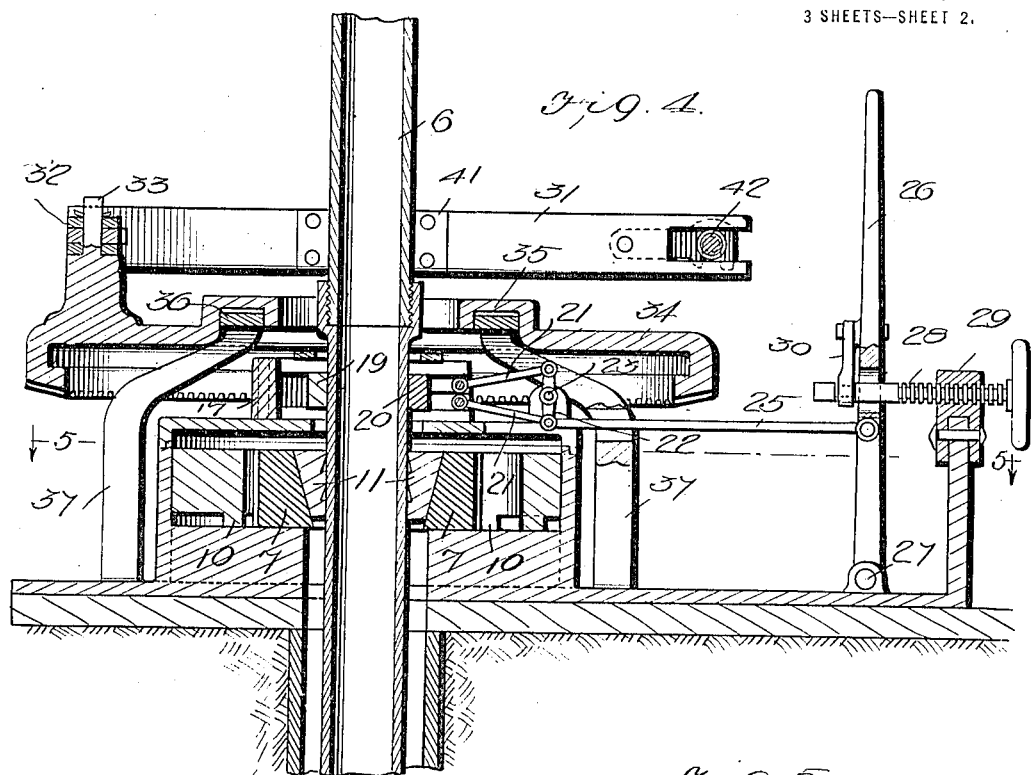
Fig. 4 is a section on the line 4—4 of Fig. 5, looking in the direction of the arrows adjacent the line.
Figure 5:
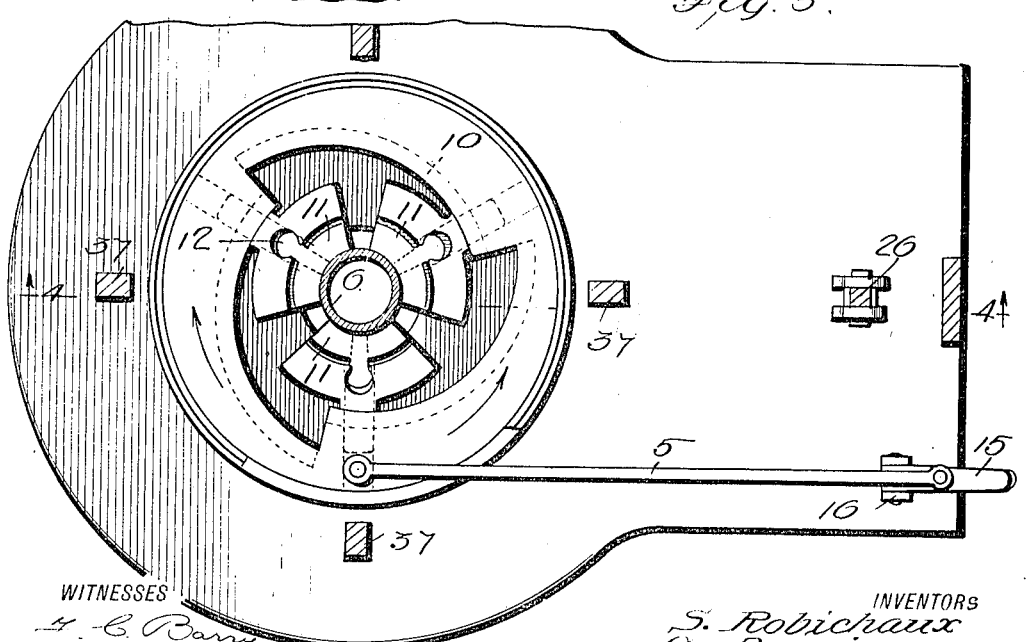
Fig. 5 is a section on the line 5—5 of Fig. 4, looking in the direction of the arrows adjacent the line.

In the present embodiment of the invention, a suitable base 1 is provided, and upon this base is a housing 2 having a removable top 3. The housing is circular, and within the same is arranged a cam ring 4, the said ring being mounted to rotate in the housing, and having connected therewith a link 5 for rotating the cam ring.

This link is connected at its outer end with suitable operating mechanism to be later described, and the cam ring has three cam portions, each of which coöperates with a holding dog for the pipe 6. Each of the holding dogs consists of a body 7 having an outwardly extending finger 8 provided with an upturned lug 9. These fingers extend beneath the cam ring, and the lugs engage behind cam ribs 10 on the under surface of the cam ring, the said ribs being at the edges of the cam portions. It will be evident that when the ring is rotated in the proper direction the dogs 7 will be forced inwardly, while when the ring is rotated in the opposite direction the dogs will be drawn outwardly. Each dog is recessed on its inner face to receive a gripping jaw 11, and each of the said jaws has a rounded lug 12 which engages in a similar groove 13 in the recess.

It will be noted that the engaging faces of the dogs are corrugated, the corrugations facing upwardly, and a coil spring 14 is arranged beneath each of the gripping jaws, the said springs acting normally to force the jaws upwardly, that is, into released position, for it will be noticed that the recess in which the dog is received inclines downwardly and inwardly. The spring is arranged between the lug 12 and the lower end of the groove, as shown more particularly in Fig. 3. Three dogs and three gripping jaws are provided, and when they are moved into engagement with the pipe and the pipe is then permitted to move downwardly as far as the dogs will permit, the springs 14 will be compressed, and the dogs will be moved inwardly into tight engagement with the pipe, to prevent further downward movement of the same.

The operating mechanism for the link 5 is a lever 15 which is pivoted to the base as indicated at 16, and is operated manually to move the cam ring. In order to prevent rotation of the pipe 6 during the unscrewing of the upper section, clamping mechanism is provided, arranged above the holding mechanism. This clamping mechanism comprises a housing 17 which is mounted on the cover 3, and through which the pipe 6 may extend. This housing is open at one end, and has internal guideways at the opposite sides, for receiving a sectional housing 18, which slides within the housing 17. This housing 18 has inwardly facing channel shaped guides, which are adapted to receive the gripping jaws 19 and 20. The jaw 19 is rigid with the housing 18, forming a part thereof, while the jaw 20 is movable toward and from the jaw 19. These jaws have coöperating recesses on their adjacent faces for receiving the pipe, and the said faces have teeth or corrugations, as shown, for tightly clamping the pipe. Links 21 are connected to the jaws 19 and 20, and these links at their opposite ends are pivoted to a rock lever or cross head 22 on a shaft 23 journaled on the cover. It will be noticed from an inspection of Figs. 7, 9 and 10 that each jaw 19 and 20 is substantially U-shaped, and that the arms of the jaw 19 form the guides for the arms of the jaw 20. The arms of each jaw are connected by rods or cross bars 24, and the links 21 are pivoted to these rods or cross bars.

In operation, when the cross head 22 is oscillated in one direction, the jaws will be moved toward each other, while when the rock lever is oscillated in the opposite direction the jaws will be moved away from each other. A link 25 is connected with the lower end of the rock lever, and this link is connected at its outer end to a lever 26 which is pivoted to the base, as indicated at 27. A handled screw 28 is threaded through a nut 29 supported on the base, and this screw extends through a slot or opening in the lever 26. The inner end of the screw is reduced annularly for engagement by a latch 30 pivoted to the lever to hold the screw from movement transversely with respect to the lever.

In the use of the device, when the clamping jaws are clamped on the pipe as tightly as is possible with the lever 26, the handled screw in the position of Fig. 4 is engaged by the latch 30. With the parts in this position it will be evident that when the handled screw is turned in the proper direction the lever 26 will be forced to still further tighten the clamping jaws 19 and 20. In using the device, the pipe is lifted by the usual lifting mechanism of the derrick (not shown) until the joint is just above the device, that is, a trifle higher than the position shown in Fig. 2.

The lever 15 is now operated to press the holding dogs into contact with the pipe, and when the pipe is permitted to drop a trifle, that is, into the position of Fig. 2, the said holding dog will be forced into close contact with the pipe and will hold the same from further downward movement. Now the lever 26 is operated as above mentioned to close the clamping dogs on the pipe to prevent rotation thereof. After this has taken place the unthreading mechanism, to be described, is brought into play.

The said mechanism comprises a pair of levers 31 which are pivoted at one end to the ends of a cross head 32 on a pin 33 extending upwardly from one side of a bevel gear wheel 34 which is mounted to rotate about the pipe, the said bevel gear wheel having on its under face an annular groove or trackway 35 which is co-axial with the pipe. Within this groove is received a turntable or fifth wheel 36 which is supported from the base by means of bracket arms 37.

The teeth of the wheel 34 mesh with the teeth of a bevel wheel 38 which is secured to a shaft 39 journaled in bearings 40 on the base and adapted to be connected with any suitable source of power for operating the same. The levers 31 have gripping dogs 41 on their inner faces at the point where they engage the pipe. A handled screw 42 is threaded through one of the levers 31 and passes through an opening in the end of the other lever, where it is adapted to be engaged by a latch 43, the screw being annularly grooved in the same manner as the screw 28.

In operation, after the clamping dogs have been engaged with the pipe in the manner hereinbefore described, the levers 31 are clamped about the pipe by means of the handled screw, and when this has been done the shaft 39 is rotated to rotate the gear wheel 34 to unscrew the uppermost section of pipe. The pipe is now again lifted until another joint comes above the device, when the operation is repeated, and this is done as often as may be necessary.

We claim:

1. A device of the character specified, comprising a base adapted to seat over a well casing and having an opening through which the casing may extend, holding means supported by the base through which the pipe is adapted to extend for engaging the pipe to prevent downward movement of the pipe, clamping means above the holding means for gripping the pipe to prevent rotation thereof, and means above the clamping means for engaging the next upper section to unthread the same from the next lower section, said last named means comprising a gear wheel having an opening through which the pipe extends, the base having a turntable upon which the gear wheel moves, levers pivoted to the gear wheel and adapted to engage opposite sides of the pipe and having gripping jaws for engaging the pipe, means for forcing the levers together, and means for rotating the gear wheel.

2. A device of the character specified, comprising a base adapted to seat over a well casing and having an opening through which the casing may extend, holding means supported by the base through which the pipe is adapted to extend for engaging the pipe to prevent downward movement of the pipe, clamping means above the holding means for gripping the pipe to prevent rotation thereof, means above the clamping means for engaging the next upper section to unthread the same from the next lower section, said first named means comprising a cam ring upon the base, gripping dogs movable radially of the base toward and from the pipe, each dog having an outwardly extending finger provided with an upstanding lug, and a ring having a rib for engagement by the lug of the finger, said ribs being eccentric to the cam ring, and means for oscillating the ring, each dog having a recess on its inner face and provided with an inclined bottom wall, a gripping jaw in each recess and having a bevel portion coöperating with the inclined bottom to force the dog to draw inwardly as it is moved downwardly, and a spring normally pressing each jaw upwardly.

3. A device of the character specified, comprising a base adapted to seat over a well casing and having an opening through which the casing may extend, holding means supported by the base through which the pipe is adapted to extend for engaging the pipe to prevent downward movement of the pipe, clamping means above the holding means for gripping the pipe to prevent rotation thereof, means above the clamping means for engaging the next upper section to unthread the same from the next lower section, said first named means comprising a cam ring upon the base, gripping dogs movable radially of the base toward and from the pipe, each dog having an outwardly extending finger provided with an upstanding lug and a ring having a rib for engagement by the lug of the finger, said ribs being eccentric to the cam ring, and means for oscillating the ring.

4. A device of the character specified, comprising a base adapted to seat over a well casing and having an opening through which the casing may extend, holding means supported by the base through which the pipe is adapted to extend for engaging the pipe to prevent downward movement of the pipe, clamping means above the holding means for gripping the pipe to prevent rotation thereof, means above the clamping means for engaging the next upper section to unthread the same from the next lower section, said second named means comprising a pair of clamping jaws having guided movement toward and from each other, the pipe being adapted to pass between the jaws, and means for simultaneously moving the jaws in opposite directions.

5. In a device of the character specified, clamping means for a pipe for preventing turning thereof, said means comprising a pair of jaws adapted to receive the pipe between them and movable toward and from the pipe, one of the jaws having guiding means for the other jaw, a lever connected with the jaws for moving the said jaws toward and from each other, and means for holding the lever in adjusted position, said means comprising a handled screw, a fixed nut through which the screw is threaded, said screw having a reduced portion at the end adjacent to the lever and the lever having an opening through which the screw passes, and a latch member pivoted on the lever for engaging the reduced portion of the screw to hold the lever to the screw.

6. In a device of the character specified, means for turning the pipe, comprising a gear wheel having an opening through which the pipe is adapted to extend, means for turning the gear wheel, clamping means for the pipe on the gear wheel, said clamping means comprising a pair of levers pivoted to the gear wheel and adapted to engage opposite sides of the pipe and having gripping jaws for the pipe, a handled screw threaded through one lever, the other lever having an opening through which the screw extends, said screw having a reduced portion and the lever having a latch for engaging the same to lock the lever to the screw.

SOSTHENE ROBICHAUX.
CHAS. PAGGI.

Witnesses:
HARRY STERNBERG,
ABE COOPERSTEIN.